(12) United States Patent
Yan

(10) Patent No.: US 7,916,796 B2
(45) Date of Patent: Mar. 29, 2011

(54) REGION CLUSTERING BASED ERROR CONCEALMENT FOR VIDEO DATA

(75) Inventor: Yong Yan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1561 days.

(21) Appl. No.: 11/254,166

(22) Filed: Oct. 19, 2005

(65) Prior Publication Data

US 2007/0086527 A1    Apr. 19, 2007

(51) Int. Cl.
  *H04N 7/12*   (2006.01)
  *H04N 11/04*  (2006.01)
  *H04N 11/02*  (2006.01)
(52) U.S. Cl. .......... 375/240.27; 375/240.16; 375/240.24
(58) Field of Classification Search ............ 375/240.13, 375/240.16, 240.24, 240.26, 240.27
See application file for complete search history.

(56) References Cited

U.S. PATENT DOCUMENTS

| | | | |
|---|---|---|---|
| 6,285,715 B1 * | 9/2001 | Ozcelik et al. | 375/240.27 |
| 6,865,227 B2 | 3/2005 | Chan | |
| 6,985,856 B2 * | 1/2006 | Wang et al. | 704/226 |
| 7,684,492 B2 * | 3/2010 | Seo | 375/240.27 |
| 2003/0031261 A1 * | 2/2003 | Valente et al. | 375/240.27 |
| 2003/0039312 A1 * | 2/2003 | Horowitz et al. | 375/240.24 |
| 2003/0161402 A1 * | 8/2003 | Horowitz | 375/240.16 |
| 2004/0139462 A1 | 7/2004 | Hannuksela et al. | |
| 2004/0146113 A1 | 7/2004 | Valente | |
| 2004/0258163 A1 * | 12/2004 | Yu et al. | 375/240.27 |
| 2005/0025249 A1 | 2/2005 | Zhao et al. | |
| 2005/0254584 A1 * | 11/2005 | Kim et al. | 375/240.27 |
| 2006/0051068 A1 * | 3/2006 | Gomila | 386/114 |
| 2006/0188025 A1 * | 8/2006 | Hannuksela | 375/240.27 |
| 2007/0014360 A1 * | 1/2007 | Botzko et al. | 375/240.16 |

FOREIGN PATENT DOCUMENTS

WO    WO 2005/004491 A1    1/2005

OTHER PUBLICATIONS

Thomas Wiegand, Gary J. Sullivan, Gisle Bjontegaard and Ajay Luthra, *Overview of the H.264/AVC Video Coding Standard* IEEE Transactions on Circuits and Systems for Video Technology, vol. 13, No. 7 Jul. 2003.

Iain E G Richardson, *H.264/MPEG-4 Part 10:Overview*, www.vcodex.com dated Oct. 7, 2002; pp. 1-3.

(Continued)

*Primary Examiner* — Gregory M Desire
(74) *Attorney, Agent, or Firm* — Gary R. Stanford

(57) ABSTRACT

An error detection and correction circuit for a video decoder that reconstructs a lost macroblock including a clustering circuit, a classification circuit and an error concealment circuit. The clustering circuit clusters macroblocks adjacent to the lost macroblock into one or more defined clusters. The classification circuit assigns the lost macroblock or each sub-block of the lost macroblock to a defined cluster. The error concealment circuit reconstructs attributes of the lost macroblock or its sub-block based on selected attributes of a defined cluster to which the lost block is assigned. Clustering is based on entire adjacent macroblocks or sub-blocks thereof. The clustering circuit may perform clustering using any one or more of the attributes of the macroblocks including coding parameters, texture statistics, color components, frequency analysis, and image processing operators. The lost macroblock may be assigned as a whole or subdivided into lost sub-blocks that are individually assigned to clusters.

20 Claims, 7 Drawing Sheets

OTHER PUBLICATIONS

Iain E G Richardson, *H.264/MPEG-4 Part 10:Introduction to CABAC*, www.vcodex.com dated Oct. 17, 2002; pp. 1-3.
Iain E G Richardson, *H.264/MPEG-4 Part 10:Variable Length Coding*, www.vcodex.com dated Oct. 17, 2002; pp. 1-7.
Iain E G Richardson, *H.264/MPEG-4 Part 10:Transform & Quantization*, www.vcodex.com dated Mar. 19, 2003; pp. 1-9.
Iain E G Richardson, *H.264/MPEG-4 Part 10:Interprediction*, www.vcodex.com dated Mar. 30, 2003; pp. 1-3.
Iain E G Richardson, *H.264/MPEG-4 Part 10:Intra Prediction*, www.vcodex.com dated Mar. 30, 2003; pp. 1-5.
Iain E G Richardson, *H.264/AVC Frame and Picture Management*, www.vcodex.com dated Jan. 29, 2004; pp. 1-7.
Wayne E. Bretl and Mark Fimoff, *MPEG2 Tutorial* (*Introduction to MPEG 2 Video Compression*), www.bretl.com Jan. 15, 2000. http://www.bretl.com/mpeqhtml/mpeq2vc1.HTM.
Yu Chen, Keman Yu, Jiang Li and Shipeng Li, *An Error Concealment Algorithm for Entire Frame Loss in Video Transmission*, Picture Coding Symposium 2004, Dec. 15-17, 2004, San Francisco, USA.
J.Park, D-C Park, R.J. Marks, M.A. El-Sharkawi, *Content-Based Adaptive Spatio-Temporal Methods for MPEG Repair*, IEEE TRANS, ON Image Processing, vol. 13, No. 8, Aug. 2004.

* cited by examiner

REGION CLUSTERING BASED ERROR CONCEALMENT FOR VIDEO DATA

BACKGROUND OF THE INVENTION

1. Field of the Invention

The present invention relates in general to video decoding, and more specifically to a system and method of region clustering based error concealment for recovering video packet loss in video communications.

2. Description of the Related Art

The Advanced Video Coding (AVC) standard, Part 10 of MPEG4 (Motion Picture Experts Group), otherwise known as International Telecommunication Union (ITU) H.264, include advanced compression techniques that were developed to enable transmission of video signals at a lower bit rate or storage of video signals using less storage space. The newer standard outperforms video compression techniques of prior standards in order to support higher quality streaming video at lower bit-rates and to enable internet-based video and wireless applications and the like. The standard does not define the CODEC (encoder/decoder pair) but instead defines the syntax of the encoded video bitstream along with a method of decoding the bitstream. Each video frame is subdivided and encoded at the macroblock level, where each macroblock is a 16×16 block of pixels. Each macroblock is encoded in 'intraframe' mode in which a prediction macroblock is formed based on reconstructed macroblocks in the current frame, or 'interframe' mode in which a prediction macroblock is formed based on previously reconstructed frames. The intraframe coding mode applies spatial information within the current frame in which the prediction macroblock is formed from samples in the current frame that have previously encoded, decoded and reconstructed. The interframe coding mode utilizes temporal information from previous and/or future reference frames to estimate motion to form the prediction macroblock.

It is often necessary to transmit video information over unreliable networks, such as error-prone wireless channels and the like. In an exemplary configuration, the video information is encapsulated into Real-time Transport Protocol (RTP) packets or the like in which each packet includes one or more macroblocks of a video frame. During transmission, one or more packets may be lost or corrupted due to traffic congestion or to random or burst bit errors or the like. When a packet is lost in real time, the corresponding coded macroblocks and the subsequent frames are degraded without error concealment. To further increase coding efficiency in terms of rate distortion, the newer video codec, such as according to H.264/MPEG-4 AVC, utilizes spatial-temporal correlations among macroblocks as much as possible. As a result, if a packet loss happens, the errors caused by missing information are propagated quickly without concealment. The existing video coding standards do not address error handling or concealment.

Existing solutions address recovering a lost macroblock locally by use of spatial-temporal correlations without classifying the macroblocks, which may lead to discontinuity in the boundary of the recovered macroblock and the surrounding macroblocks. The resulting video appears unpleasant or incoherent. It is desired to provide error concealment for robust video communications. Developing effective and efficient error concealment solutions for a decoder is a challenging problem.

BRIEF DESCRIPTION OF THE DRAWINGS

The benefits, features, and advantages of the present invention will become better understood with regard to the following description, and accompanying drawings in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
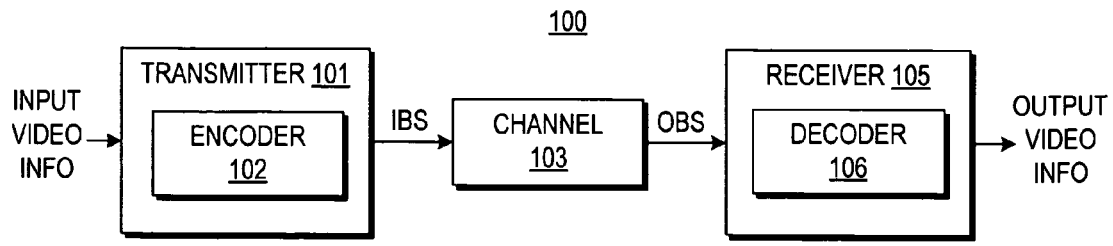
FIG. 1 is a simplified block diagram of a video system including a decoder implemented according to an embodiment of the present invention.

FIG. 1 is a simplified block diagram of a video system 100 including a decoder 106 implemented according to an embodiment of the present invention. Video information is provided to an input of a transmitter 101, which includes an encoder 102. The encoder 102 encodes the video information according to the appropriate video standard (e.g., MPEG-4, H.264, etc.) and the transmitter 101 further processes the information according to the targeted media or medium for which it is designed. The video information is transmitted as in input bitstream IBS via a channel 103 and provided as an output bitstream OBS to a receiver 105, which includes a decoder 106 implemented according to an embodiment of the present invention. In an exemplary configuration, the channel 103 is a relatively unreliable medium such as a wireless medium or the like. The transmitter 101 encapsulates the video information into RTP packets or the like in which each packet includes one or more macroblocks of a video frame. Since the channel 103 is relatively unreliable, it is possible that one or more packets are lost in transmission and that the corresponding lost data must be replaced, reconstructed or otherwise error-concealed. The decoder 106 is configured to perform region clustering based error concealment to replace or otherwise reconstruct the missing information. Since the original data is lost during transmission, the goal is not to 100% replicate the missing information but instead to insert information into missing macroblocks to conceal the error to provide an improved visual result as compared to conventional methods.

Figure 2:
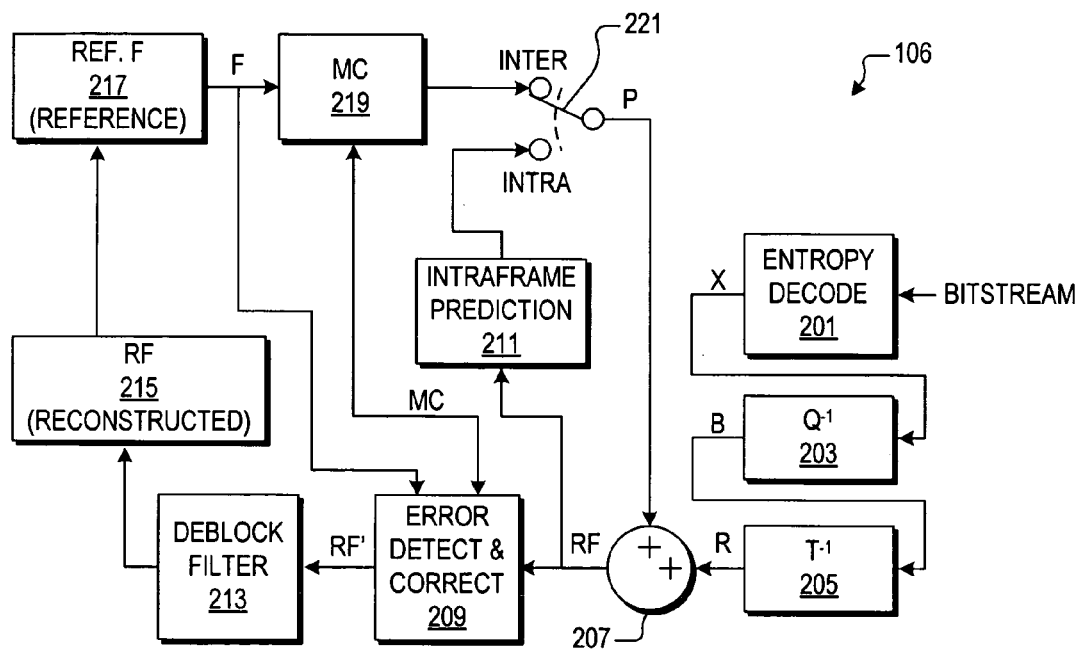
FIG. 2 is a simplified block diagram of the decoder of FIG. 1 implemented according to an exemplary embodiment of the present invention.

FIG. 2 is a simplified block diagram of the decoder 106 implemented according to an exemplary embodiment of the present invention. A bitstream from the channel 103 is provided to an entropy decode circuit 201, which outputs quantized transform coefficients X. The X coefficients are provided to the input of an inverse quantization circuit 203, which outputs estimated transformed information B. The estimated transformed information B is provided to the input of an inverse transform circuit 205, which performs a block transform, such as the inverse discrete cosine transform (IDCT) or the like, and which outputs residual information R (and motion vectors, if any, along with macroblock type information). The residual information R is provided to a first positive input of an adder 207, which receives selected prediction macroblocks P at another positive input. In the embodiment shown, the adder 207 adds P to R to generate an unfiltered reconstructed macroblock, which becomes part of reconstructed frame information RF. The reconstructed frame information RF is provided to an input of an error detection and correction circuit 209 and to an input of an intraframe prediction circuit 211. The error detection and correction circuit 209 has an output providing corrected reconstructed frame information RF' to an input of a deblocking filter circuit 213 (e.g., per H.264 specification). The deblocking filter circuit 213 filters the corrected reconstructed frame information RF' and provides filtered reconstructed frames to an RF storage 215. The previously decoded frames from the RF storage 215 are provided to a reference frame storage 217 to serve as reference frames for purposes of interframe decoding as known to those skilled in the art. The video information in the RF storage 215 may be displayed or transferred to other storage media as desired.

The reference frame storage 217 provides reference frames (F) to an input of a motion compensation (MC) circuit 219 and to another input of the error detection and correction circuit 209. The MC circuit 219 provides motion compensated prediction information (e.g., interframe prediction macroblock) INTER to a first input terminal of a selector switch 221, illustrated as a single-pole, double-throw (SPDT) having two input terminals and a common terminal output. The intraframe prediction circuit 211 provides intraframe prediction information (e.g., intraframe prediction macroblock) INTRA to the other input terminal of the switch 221. The switch 221 selects between the interframe prediction macroblock INTER and the intraframe prediction macroblock INTRA to provide the selected prediction macroblock P based on the macroblock type information sent by the encoder. The error detection and correction circuit 209 is also coupled to the MC circuit 219 for receiving motion compensation information MC for error concealment as further described below. The motion compensation information MC may include, for example, a macroblock or sub-macroblock from a reference frame F based on a calculated motion vector. It is appreciated that the block diagram is simplified and that many details are omitted as not relevant to the present invention and that alternative topologies are possible and contemplated.

Figure 3:
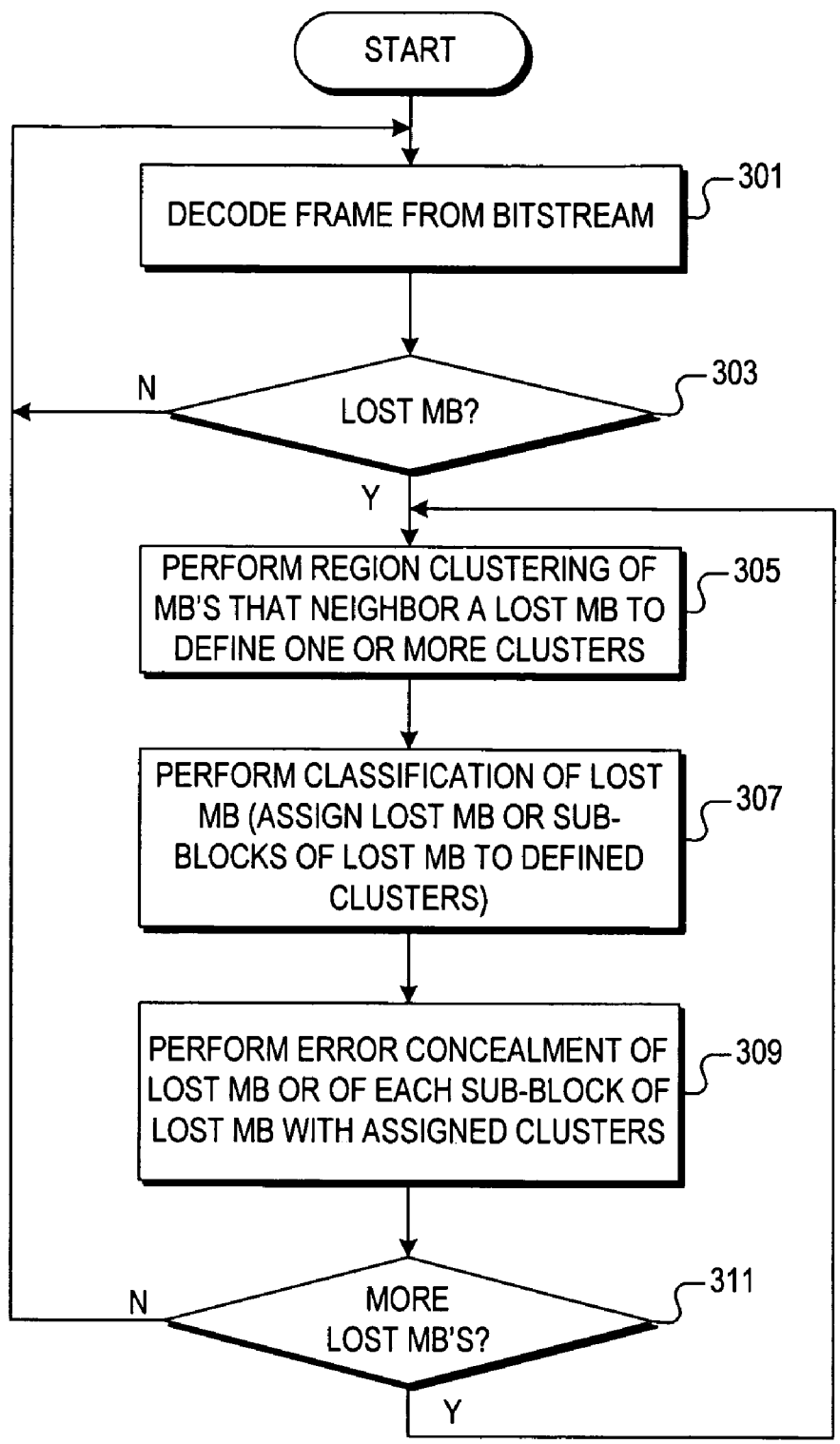
FIG. 3 is a flowchart diagram illustrating region clustering based error concealment performed by the error detection and correction circuit of FIG. 2 for recovering video information loss in video communications according to an embodiment of the present invention.

FIG. 3 is a flowchart diagram illustrating region clustering based error concealment performed by the error detection and correction circuit 209 for recovering video information loss in video communications according to an embodiment of the present invention. The process illustrated is performed by error detection and correction circuit 209 of the decoder 106 while reconstructing video frames from the input bitstream. At first block 301, a video frame from the input bitstream is decoded. The resulting reconstructed frame information RF is provided to the error detection and correction circuit 209 of the decoder 106. At next block 303, it is queried whether the reconstructed frame information RF has at least one lost macroblock (MB). As previously described, a packet may be lost during transmission through the channel 103, where the lost packet included one or more macroblocks of a video frame. If there are no lost macroblocks, operation returns back to block 301 to decode the next video frame. If at least one macroblock is lost, operation proceeds to block 305 in which region clustering of neighboring macroblocks of the lost macroblock is performed.

Region clustering may be performed on different levels, such as the entire macroblock or sub-blocks of the lost macroblock (or any other suitable subdivision of a macroblock). In H.264/MPEG-4 AVC, for example, region clustering may be done based on the motion modes of each macroblock, e.g. 16×16, 16×8, 8×16, 8×8, 8×4, 4×8 or 4×4. Although it may be possible to subdivide a macroblock down to the pixel level, the minimum coding unit for MPEG-4 standard is the 4×4 sub-block of pixels. The attributes of the neighboring macroblocks or sub-blocks are used for clustering. Examples of attributes are coding parameters (motion vectors, residual energy, coding block pattern), texture statistics (e.g. mean, variance), color components, frequency analysis (filtering, FFT/DCT/wavelets), image processing operators, etc. Any one or more of the classical clustering algorithms may be used, such as the K-means algorithm and the Markov Random Field theory and the like. Clustering generally involves applying mathematical algorithms to selected attributes of the macroblocks or sub-blocks of the macroblocks that neighbor the lost macroblock (e.g., adjacent to the lost macroblock in the horizontal, vertical and diagonal directions) and then grouping the blocks (macroblocks or sub-blocks thereof) to form clusters.

As an example, clustering may be based on the motion vectors, in which the neighboring blocks which have similar motion vectors are grouped together into clusters having the same or similar motion vectors. In this case, at least one assumption is that blocks (macroblocks or sub-blocks) having the same or similar motion vectors are part of a larger moving object in the frame. The color components (e.g., luma, chroma) may be used with the assumption that blocks having the same or similar color attributes belong to the same object. Similar assumptions apply for the other attributes. Of course, combinations of attributes may be employed to refine the assumptions. For example, blocks with similar color attributes might not be clustered together if having different, conflicting or even opposite motion vectors.

After clustering is performed, operation proceeds to block 307 in which classification of the lost macroblock is performed. During classification, the entire lost macroblock is assigned to a defined cluster, or the lost macroblock is subdivided into sub-blocks and each sub-block of the lost macroblock is assigned to a defined cluster. If there is only one defined cluster surrounding the lost macroblock, then the lost macroblock is classified into the only defined cluster. If multiple clusters are defined and borders of the clusters subdivide the lost macroblock, then the lost macroblock is itself sub-divided based on the borders and the sub-blocks of the lost macroblock are classified into those regions in which they are located or in which they are most closely associated with according to the selected attributes.

After classification is performed, operation proceeds to block 309 in which error concealment is performed on the lost macroblock or each assigned sub-block thereof. The lost macroblock may be "recovered" by averaging the attributes of defined clusters and applying the averaged value to the macroblock or to each sub-block assigned to that cluster. For example, in one embodiment the motion vectors are used for motion compensation (temporal) and/or the texture around the boundaries are applied into final refinements (spatial). Any spatial-temporal error concealment method may be used after the lost macroblock is classified. For example, motion vector interpolations or averaging/median filtering are applied inside a cluster to obtain an estimated motion vector for the lost macroblock or for each sub-block of the lost macroblock. Then, the estimated motion vectors are used to perform motion compensation to restore the lost macroblock. In the embodiment illustrated, the error detection and correction circuit 209 employs the MC circuit 219 for performing motion compensation. If all or most of the macroblocks in the cluster are intraframe encoded, or if they are in an I-frame, such that motion vector information is not available, then spatial interpolation is conducted.

After error concealment is performed, operation proceeds to block 311 in which it is queried whether there are additional lost macroblocks in the current frame. If so, operation returns to block 305 to perform region clustering for the next lost macroblock, and operation loops in this manner until all of the lost macroblocks in the current frame have been restored. Otherwise, if there are no more lost macroblocks in the current frame, then operation proceeds to block 301 to decode the next frame. The error detection and correction circuit 209 recovers the lost macroblocks in the reconstructed frame information RF and forms new, corrected reconstructed frame information RF'.

Figure 4:
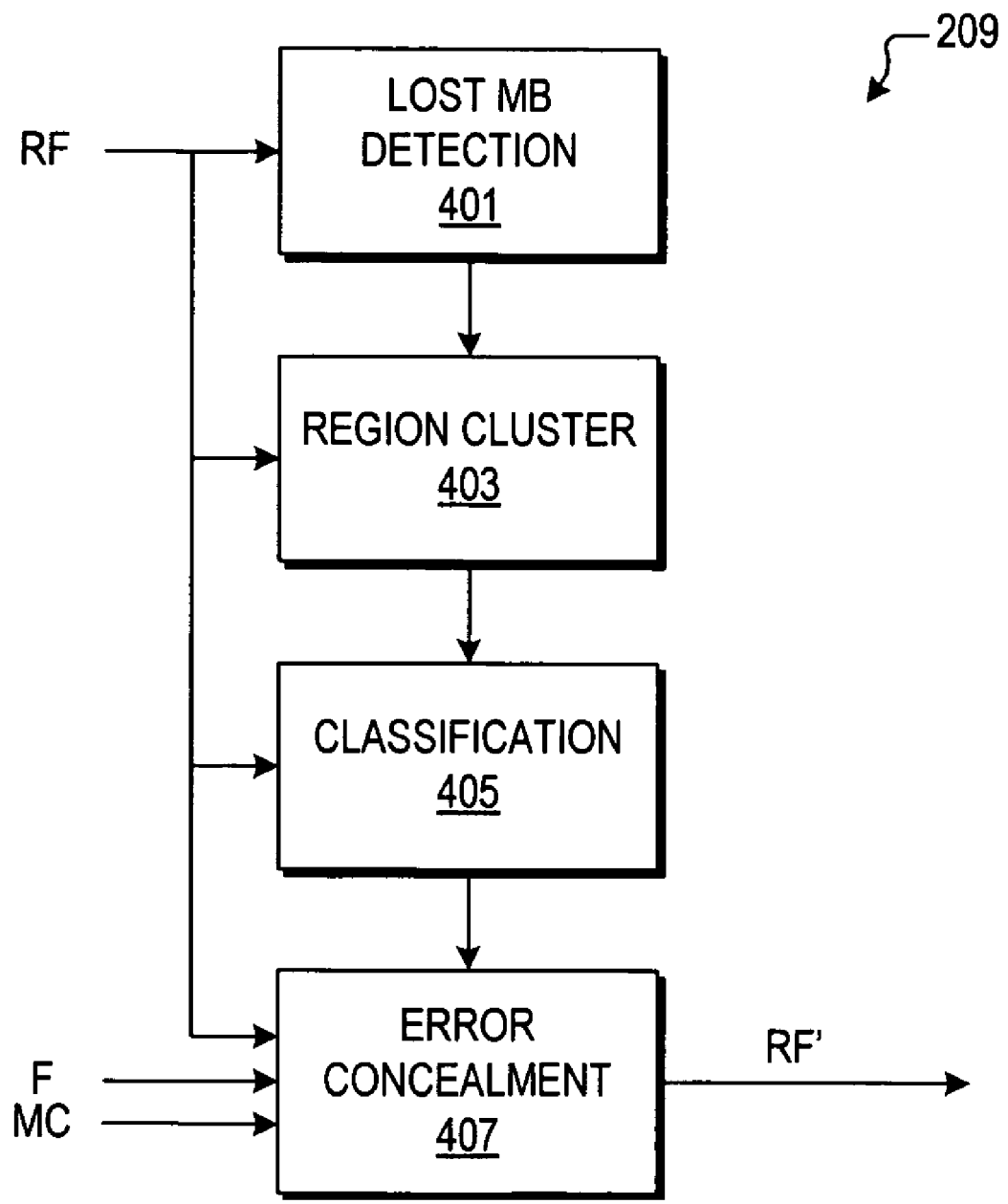
FIG. 4 is a simplified functional block diagram of an applicable portion of the error detection and correction circuit of FIG. 2 according to an exemplary embodiment of the present invention.

FIG. 4 is a simplified functional block diagram of an applicable portion of the error detection and correction circuit 209 according to an exemplary embodiment of the present invention. The functional blocks illustrated may each be implemented in any suitable manner as understood by those skilled in the art. In the embodiment illustrated, for example, each functional block is described as being performed by a separate circuit with corresponding inputs and outputs for passing the processed information. Alternatively, the functional blocks may be performed procedures or functions or the like in code or software or programs or the like executed by a processor or processing logic as known to those skilled in the art.

The reconstructed frame information RF is provided to a lost macroblock detection circuit 401, to a region cluster circuit 403, to a classification circuit 405, and to an error concealment circuit 407. The lost macroblock detection circuit 401 detects the last macroblock received for the current frame and determines whether there are any lost macroblocks. If there is at least one lost macroblock, the lost macroblock detection circuit 401 provides the identification of each lost macroblock to the region cluster circuit 403, which performs the region clustering function as previously described to define one or more clusters in which the neighboring macroblocks or sub-blocks thereof are grouped. The clustering information is provided to the classification circuit 405, which assigns the lost macroblock or each of its sub-blocks to a defined cluster. The classification information is provided to the error concealment circuit 407, which reconstructs the attributes of the lost macroblock or each of its sub-blocks based on the classification information. The error concealment circuit 407 may employ temporal information using reference frame F. Also, the error concealment circuit 407 may receive motion compensation information from the MC circuit 219. The error concealment circuit 407 reconstructs the missing macroblock of the reconstructed frame information RF resulting in the corrected reconstructed frame information RF'. The process is repeated for each lost macroblock of the current frame until each lost macroblock is reconstructed.

Figure 5:
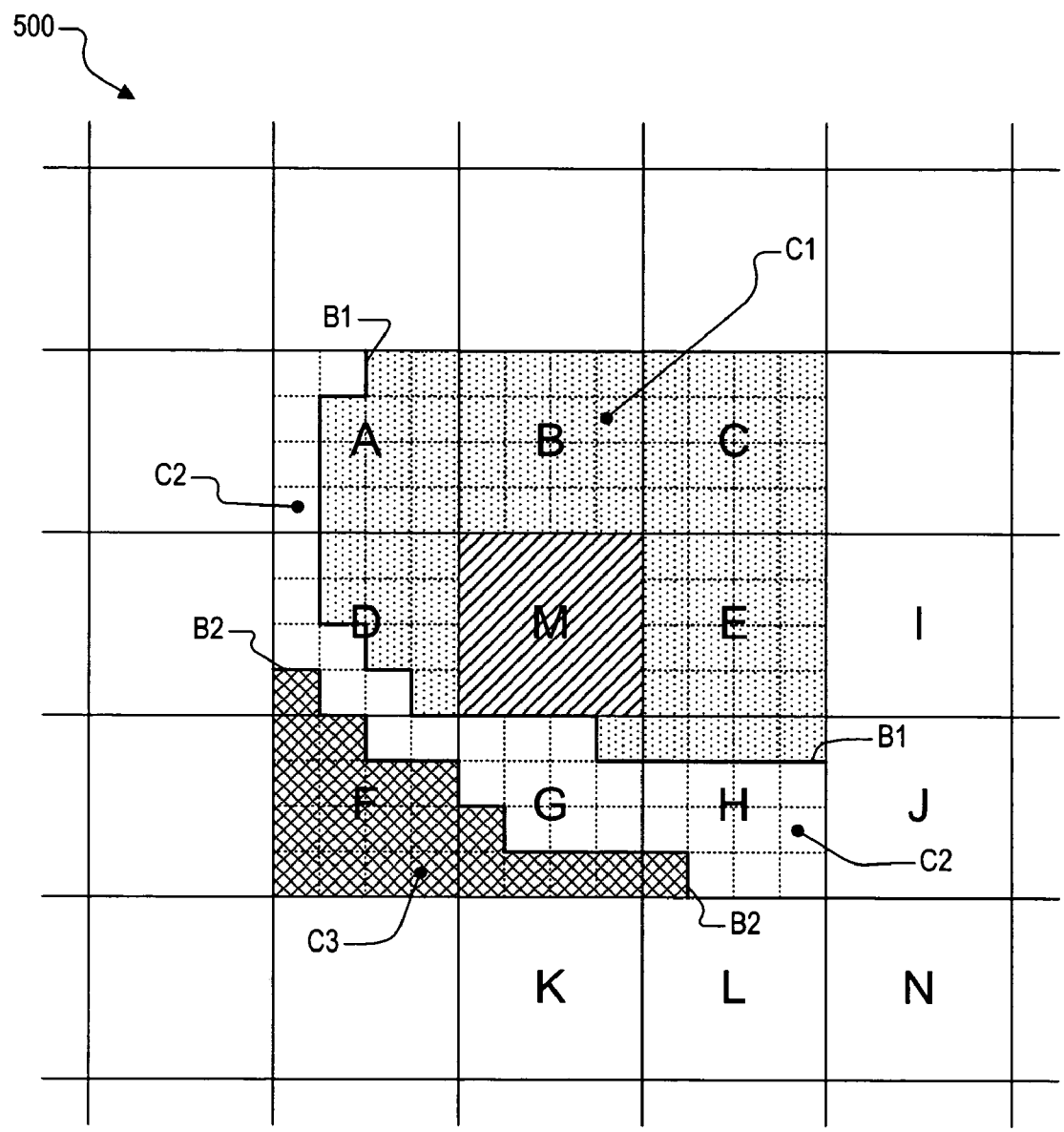
FIG. 5 is a simplified diagram of a portion of a current frame including a lost macroblock M and defined clusters C1, C2 and C3 after region clustering has been performed.

FIG. 5 is a simplified diagram of a portion of a current frame 500 including a lost macroblock M and defined clusters C1, C2 and C3 after region clustering has been performed. The lost macroblock M is shown with diagonal lines, and is adjacent neighboring and surrounding macroblocks A, B, C, D, E, F, G and H as illustrated. In this case, the neighboring macroblocks A, B, C, D, E, F, G and H are not lost and may be used for reconstruction. It is noted that if one or more of the neighboring macroblocks are also missing, such as, for example, the lower-right hand macroblock H, then M is reconstructed first without macroblock H and then the reconstructed macroblock M is used to reconstruct the lost macroblock H. In that case, for example, after M is reconstructed, the neighboring macroblocks of H, namely M, E, I, G, J, K, L and N, are used to reconstruct the lost block H. In the illustrated example, however, it is assumed for purposes of illustration that the macroblock H is not lost.

The error detection and correction circuit 209 detects the lost macroblock M and performs the region clustering process. During this process, a first cluster C1 is defined above a first border line B1 illustrated with dotted sub-blocks, a second cluster C2 is defined between the first border line B1 and a second border line B2 illustrated with unshaded sub-blocks, and a third cluster C3 is defined below the border line B2 illustrated with cross-hatched sub-blocks. Note that each 4×4 sub-block of the neighboring macroblocks A-H is assigned to one of the clusters C1-C3. The clusters C1-C3 are defined based on one or more selected attributes, such as coding parameters (motion vectors, residual energy, coding block pattern), texture statistics (e.g. mean, variance), color components, frequency analysis (filtering, FFT/DCT/wavelets), image processing operators, etc., as previously described. Thus the neighboring macroblocks B, C and E are completely within cluster C1 along with portions (e.g., selected sub-blocks) of macroblocks A, D, G and H. The neighboring macroblock F is almost completely within cluster C3 along with the lower left-hand 4×4 sub-block of macroblock D, the lower sub-blocks of macroblock G, and the lower left-hand 4×4 sub-block of macroblock H. The middle cluster C2 includes remaining sub-blocks of macroblocks A, D, G and H. Of course, other clusters (not shown) or alternative clusters may be defined based on the selected attributes and any weighting functions. The clustering illustrated in FIG. 5 was performed at the 4×4 sub-block level in which individual 4×4 sub-blocks are grouped into the clusters C1-C3. The clustering process may be performed at other sub-block sizes or combinations thereof depending upon the particular information, such as the entire macroblocks or combinations of different-sized sub-blocks (e.g., 16×8, 8×16, 8×8, etc.).

The lost macroblock M or each sub-block thereof is then classified into one of the defined clusters. In this case, the lost macroblock M appears to be entirely within the cluster C1, so that it may be classified as a whole as belonging to the cluster C1. Finally, error concealment is performed using any appropriate spatial-temporal information of the defined cluster. For example, the lost macroblock M may be recovered by averaging selected attributes of the macroblocks B, C and E and the 4×4 sub-blocks of macroblocks A, D, G and H classified into the same cluster C1.

It is entirely possible that the lost macroblock M or portions thereof should otherwise have been classified into the cluster C2 or that it contained independent portions not part of any of the defined clusters C1-C3. Yet since the information is entirely lost, it is not possible to ascertain the exact properties and attributes of the lost macroblock M. In conventional methods, error concealment involved indiscriminately averaging the attributes of all of the surrounding macroblocks A-H to reconstruct the lost macroblock M without partitioning the lost macroblock M into sub-blocks. Yet as illustrated in FIG. 5, this conventional error concealment process would likely cause the reconstructed macroblock M to appear as an anomaly or noise spot relative to the neighboring macroblocks. Assume for example that the cluster C2 is background and stationary whereas the clusters C1 and C3 are moving in substantially different or even opposite directions. Averaging the attributes of all of the attributes of all of the neighboring macroblocks A-G would like cause the reconstructed macroblock to stand out in the scene as not part of any of its surroundings. Instead, the macroblock M is reconstructed according to an embodiment of the present invention by assigning the lost macroblock to a selected one of the defined clusters C1-C3 (e.g., selected cluster C1), and then averaging, interpolating or otherwise mathematically processing/combining the attributes of the neighboring macroblocks or sub-blocks thereof belonging to the same cluster to reconstruct the lost macroblock. As illustrated in FIG. 5, for example, the reconstructed macroblock M is likely to blend in with cluster C1. In this manner, the reconstructed macroblock M is much more likely to blend in with the entire scene and not appear as an anomaly or as a noise spot. This, in turn, results in a more suitable and acceptable visual result.

Figure 6:
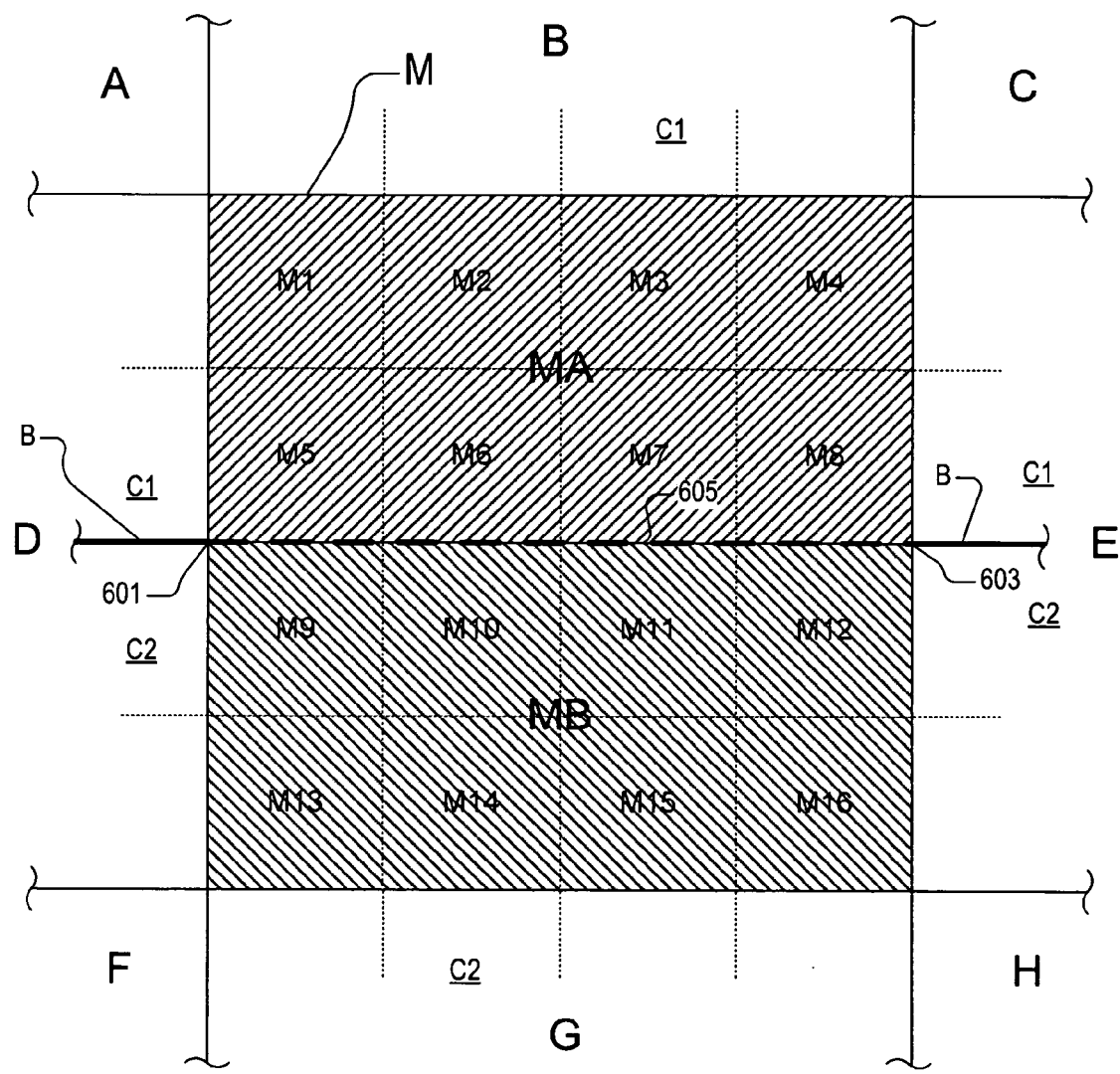
FIG. 6 is simplified block diagram of a lost macroblock M including sub-blocks that are assigned to different clusters that have been previously assigned.

FIG. 6 is simplified block diagram of a lost macroblock M including sub-blocks that are assigned to different clusters that have been previously assigned. In this case, the macroblock M is shown sub-divided into 16 4×4 sub-blocks M1, M2, M3, . . . , M16. During the region clustering procedure, two clusters C1 and C2 are defined separated by a border line B. As illustrated, the border line B terminated at a point 601 halfway between the right side of the macroblock D and also at a point 603 halfway between the left side of the macroblock E, in which cluster C1 is defined above and the cluster C2 is defined below the border line B. Initially, no portion of the lost macroblock M is assigned to either cluster during the region clustering process since only the neighboring macroblocks or portions thereof are clustered. During the classification process, the lost macroblock M or portions thereof are assigned to the defined clusters. In this case, the border line B is extended into the macroblock M as illustrated by a bold dashed line 605 between points 601 and 603. In particular, the border line B is extended horizontally along the middle of the macroblock M, so that the sub-blocks M1-M8 in the upper half are above the border line B and thus assigned to cluster C1 and the sub-blocks M9-M16 in the lower half are below the border line B and thus assigned to the cluster C2. As illustrated, the sub-blocks M1-M8 are shaded with diagonal lines slanted towards the right whereas the sub-blocks M9-M16 are shaded with diagonal lines slanted towards the left effectively dissecting the lost macroblock M into two separate portions.

It is appreciated that alternative portioning of the lost macroblock M may be employed depending upon the defined regions during clustering, such as 16×8, 8×16, 8×8, 8×4, or 4×8 as previously described. For example, after the clusters C1 and C2 are defined relative to the border B as shown in FIG. 6, it is reasonable to sub-divide the lost macroblock M into two 8×16 blocks including an upper 8×16 sub-block MA (including M1-M8) and a lower 8×16 sub-block macroblock (including M9-M16). In one embodiment, the default macroblock subdivision is down to the 4×4 level, and then adjacent sub-blocks assigned to the same cluster are combined. For example, after the border line B is extended as illustrated, each 4×4 sub-block M1-M16 of the macroblock M is assigned to one of the clusters C1 and C2 during classification. And adjacent sub-blocks assigned to the same cluster may then be combined into a larger sub-blocks prior to error concealment if desired. For example, during classification, assume sub-blocks M1-M8 are individually assigned to the cluster C1 and the sub-blocks M9-M16 are individually assigned to the cluster C2. The sub-blocks M1-M8 may then be combined to form the upper 8×16 sub-block MA and the sub-blocks M9-M16 are combined to form the lower 8×16 sub-block macroblock. The difference between eight 4×4 sub-blocks and a single 8×16 sub-block may become evident during error concealment depending upon the values of the selected attributes. For example, the attributes of the individual 4×4 sub-blocks might be reconstructed with somewhat different attributes as compared to the attributes of a single 8×16 sub-block. And the decision to combine sub-blocks may depend upon the relative sizes of the sub-blocks of the surrounding adjacent (neighboring) sub-blocks. For example, if the neighboring sub-blocks are clustered in groups of 8×8 sub-blocks, it is reasonable that the lost macroblock may be classified at the same level, i.e., into four 8×8 sub-blocks.

Figure 7:
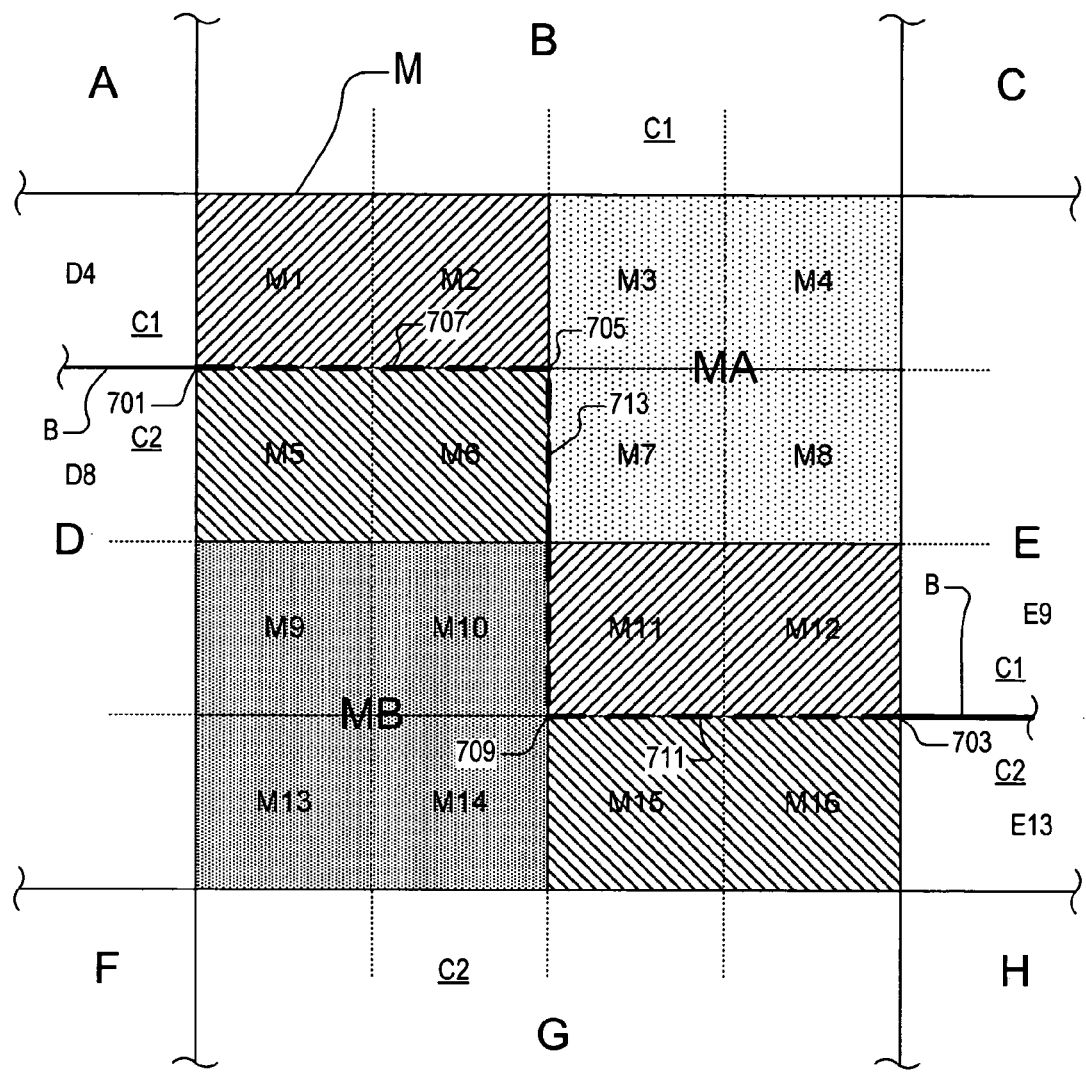
FIG. 7 is another simplified block diagram of the lost macroblock M including sub-blocks that are assigned to different clusters that have been previously assigned.

FIG. 7 is another simplified block diagram of the lost macroblock M including sub-blocks that are assigned to different clusters that have been previously assigned. In this case, the border line B terminated instead at a point 701 halfway between the 4×4 sub-blocks D4 and D8 on the upper right side of the macroblock D and also at a point 703 halfway between the 4×4 sub-blocks E9 and E13 on the lower left side of the macroblock E. The cluster C1 is defined above and the cluster C2 is defined below the border line B. Again, no portion of the lost macroblock M is initially assigned to either cluster during the region clustering process since only the neighboring macroblocks or portions thereof are clustered. During the classification process, the lost macroblock M or portions thereof are assigned to the defined clusters. In this case, the border line B is extended from point 701 by bold dashed line 707 to a point 705 at the intersection of 4×4 sub-blocks M2, M3, M6 and M7 and the border line B is extended from point 703 by bold dashed line 711 to a point 709 at the intersection of 4×4 sub-blocks M10, M11, M14 and M15. And then another bold dashed line 713 is drawn between points 705 and 709 dissecting macroblock M in half. In this case, however, the 4×4 sub-blocks M1-M4, M7, M8, M11 and M12 are above the border line B and thus assigned to cluster C1 whereas the 4×4 sub-blocks M5, M6, M9, M10 and M13-M16 are below the border line B and thus assigned to cluster C2.

In one embodiment, the attributes of the 4×4 sub-blocks M1-M4, M7, M8, M11 and M12 assigned to cluster C1 are individually determined and assigned and the 4×4 sub-blocks M5, M6, M9, M10 and M13-M16 assigned to cluster C2 are individually determined and assigned. Alternatively, additional grouping is possible into larger sub-blocks MA and MB illustrated with alternative shading. In particular, the 4×4 sub-blocks M3, M4, M7 and M8 are grouped together into a larger 8×8 sub-block MA assigned to cluster C1 and the 4×4 sub-blocks M9, M10, M13 and M14 are grouped together into a larger 8×8 sub-block MB assigned to cluster C2. Thus, sub-blocks M1, M2, MA, M11 and M12 are separately processed according to the selected attributes of cluster C1 and sub-blocks M5, M6, MB, M15 and M16 are separately processed according to the selected attributes of cluster C2. Note the shading of 4×4 sub-blocks M1, M2, M11 and M12 is the same and that the shading of MA is different although assigned to the same cluster C1 and that the shading of 4×4 sub-blocks M5, M6, M15 and M16 is the same and that the shading of sub-block MB is different although assigned to the same cluster C2.

It is appreciated that the sub-division of the lost macroblock M during classification is somewhat arbitrary and that many variations are possible. For example, In FIG. 6, the lost macroblock M may instead be assigned in its entirety to either cluster C1 or C2 rather than subdividing into separate portions separately assigned. In FIG. 7, the lost macroblock M may also be assigned in its entirety to either cluster C1 or C2, or subdivided in a different manner. For example, in FIG. 7, the upper sub-blocks M1-M12 could instead be assigned to the cluster C1 whereas the lower sub-blocks M13-M16 assigned to the cluster C2. Or, the upper sub-blocks M1-M4 could instead be assigned to the cluster C1 whereas the lower sub-blocks M5-M16 assigned to the cluster C2. Regardless of which subdivision is employed, error concealment is improved since each lost macroblock or sub-blocks thereof is reconstructed using the attributes of clustered macroblocks or sub-blocks thereof rather than simply as the indiscriminate average of all of the neighboring macroblocks. The additional refinement of region clustering and classification results in improved error concealment as compared to conventional methods.

Figure 8:
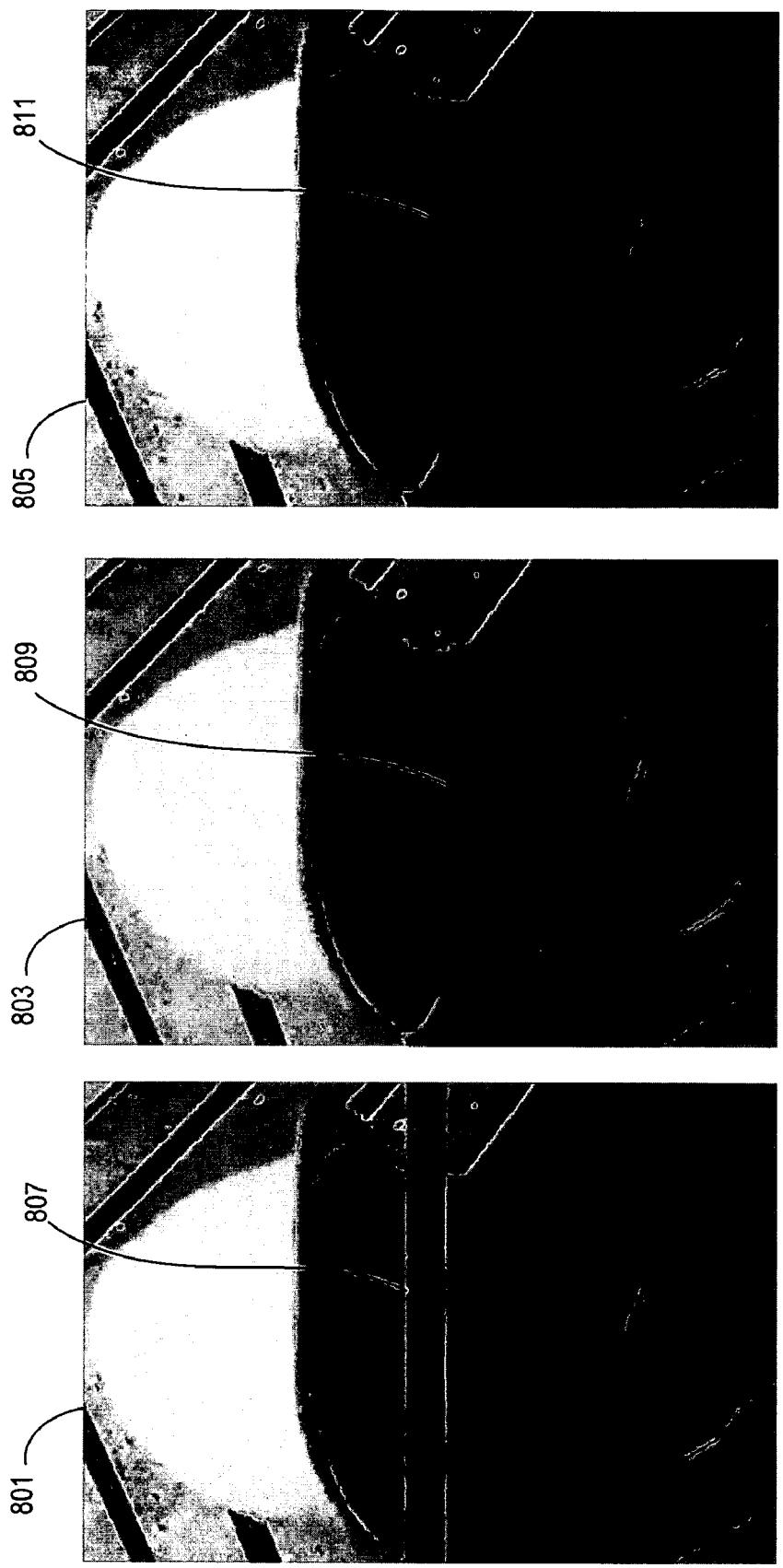
FIG. 8 is a pictoral diagram illustrating three MPEG-based pictures positioned side-by-side for comparing results of the conventional error concealment method as compared to error concealment according to an exemplary embodiment of the present invention.

FIG. 8 is a pictoral diagram illustrating three MPEG-based pictures positioned side-by-side for comparing results of the conventional error concealment method as compared to error concealment according to an exemplary embodiment of the present invention. A first MPEG generated picture 801 illustrates a horizontal band of missing macroblocks 807 near the center of the picture 801. A second MPEG generated picture 803 illustrates the same picture except in which the horizontal band of missing macroblocks 807 is replaced with information reconstructed using the conventional method of error concealment. In picture 803, a horizontal line of discontinuity 809 is clearly visible along the reconstructed macroblock band. In the case of picture 803, it is relatively obvious to the human observer that the reconstructed information based on conventional methods is incorrect thereby degrading the visual experience. A third picture 805 illustrates the same picture except in which the horizontal band of missing macroblocks 807 is replaced with information reconstructed using error concealment according to an embodiment of the present invention. In picture 805, the reconstructed information shown at location 811 blends into the scene with superior visual result as compared to that shown in the picture 803. The discontinuity 809 is almost entirely eliminated and the reconstructed information at 811 in picture 805 is not as obvious to the casual human observer and is likely to go unnoticed thereby minimizing degradation of the visual experience. Although the original information is lost and not reconstructed, the consequences are minimized and the reconstructed information is not obvious and less noticeable providing superior results.

An error detection and correction circuit for a video decoder that reconstructs a lost macroblock of a video frame according to an embodiment of the present invention includes a clustering circuit, a classification circuit and an error concealment circuit. The clustering circuit clusters macroblocks adjacent to the lost macroblock into at least one defined cluster. The classification circuit assigns the lost macroblock or each sub-block of the lost macroblock to a corresponding defined cluster. The error concealment circuit reconstructs attributes of the lost macroblock or of each sub-block of the lost macroblock based on selected attributes of a defined cluster to which the lost macroblock or to which each sub-block is assigned.

The clustering circuit clusters entire adjacent macroblocks or sub-blocks thereof. The clustering circuit may perform clustering using any one or more of the attributes of the macroblocks including coding parameters, texture statistics, color components, frequency analysis, and image processing operators. The classification circuit assigns the lost macroblock in its entirety to a defined cluster or subdivides the lost macroblock into sub-blocks and assigns each sub-block to a corresponding cluster. The error concealment circuit may combine selected sub-blocks of the lost macroblock into larger sub-blocks prior to error concealment. The error concealment circuit may reconstruct the lost macroblock by averaging or interpolating selected attributes of a defined cluster. The defined cluster. The error concealment circuit may estimate at least one motion vector for the lost macroblock based on motion vectors of one or more defined clusters and receives motion compensation information for reconstructing the lost macroblock.

A video decoder using region clustering error concealment to reconstruct a lost macroblock of a video frame according to an embodiment of the present invention includes a switch, an intraframe prediction circuit, a motion compensation circuit, and adder, and an error detection and correction circuit. The switch has first and second data inputs and an output for providing selected prediction macroblocks. The intraframe prediction circuit provides intraframe prediction information to the first input of the switch. The motion compensation circuit provides motion compensated prediction information to the second input of the switch. The adder has a first input coupled to the output of the switch and an output and a second input receiving residual video information. The adder adds selected prediction macroblocks to the residual video information and provides reconstructed frame information at its output. The error detection and correction circuit has an input receiving the reconstructed frame information, and operates to detect a lost macroblock of the reconstructed frame information, group macroblocks neighboring the lost macroblock into at least one cluster, assign the lost macroblock to at least one cluster, and reconstruct the lost macroblock based on selected attributes of the cluster to which the lost macroblock is assigned.

The error detection and correction circuit may include a clustering circuit, a classification circuit and an error concealment circuit. The clustering circuit groups the neighboring macroblocks into one or more clusters. The classification circuit assigns the lost macroblock to at least one cluster. The error concealment circuit reconstructs the lost macroblock based on selected attributes of a corresponding cluster to which the lost macroblock is assigned. The clustering circuit may subdivide the neighboring macroblocks into multiple neighboring sub-blocks and group the neighboring sub-blocks into multiple clusters. The classification circuit may further subdivide the lost macroblock into lost sub-blocks and assign each lost sub-block to a cluster.

A method of performing error concealment of a lost macroblock of a video frame according to an embodiment of the present invention includes region clustering neighboring macroblocks into one or more clusters, classifying the lost macroblock to at least one cluster, and reconstructing the lost macroblock based on selected attributes of at least one cluster. The method may include subdividing the neighboring macroblocks into neighboring sub-blocks and grouping the neighboring sub-blocks into the one or more clusters. The method may include subdividing the lost macroblock into one or more lost sub-blocks if more than one cluster is defined, assigning each lost sub-block to a corresponding cluster, and reconstructing each lost sub-block based on selected attributes of a corresponding cluster to which the lost sub-block is assigned. The may include clustering based on a combination of attributes which include coding parameters, texture statistics, color components, frequency analysis, and image processing operators. The method may include averaging or interpolating attributes. The may include averaging motion vectors and motion compensating.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. An error detection and correction circuit for a video decoder that reconstructs a lost macroblock of a video frame being decoded, comprising:
   a clustering circuit that processes reconstructed frame information of the video frame being decoded, wherein said clustering circuit clusters macroblocks adjacent to the lost macroblock into at least one defined cluster based on at least one attribute of each of said macroblocks adjacent to the lost macroblock;
   a classification circuit that assigns the lost macroblock or each of a plurality of sub-blocks of the lost macroblock to a corresponding one of said at least one defined cluster; and
   an error concealment circuit that reconstructs attributes of the lost macroblock or of each of said plurality of sub-blocks of the lost macroblock based on selected attributes of said at least one defined cluster to which the lost macroblock or to which each of said plurality of sub-blocks of the lost macroblock is assigned.

2. The error detection and correction circuit of claim 1, wherein said clustering circuit clusters together each of a plurality of sub-blocks of said macroblocks adjacent to the lost macroblock into said at least one defined cluster.

3. The error detection and correction circuit of claim 1, wherein said clustering circuit performs clustering using any one or any selected combination of attributes comprising coding parameters, texture statistics, color components, frequency analysis, and image processing operators.

4. The error detection and correction circuit of claim 1, wherein said classification circuit assigns the lost macroblock in its entirety to said corresponding one of said at least one defined cluster.

5. The error detection and correction circuit of claim 1, wherein said classification circuit sub-divides the lost macroblock into a plurality of sub-blocks and assigns each sub-block of the lost macroblock to a corresponding one of said at least one defined cluster.

6. The error detection and correction circuit of claim 5, wherein said classification circuit combines selected ones of said plurality of sub-blocks of the lost macroblock commonly assigned into larger sub-blocks prior to assignment.

7. The error detection and correction circuit of claim 1, wherein said error concealment circuit reconstructs the lost macroblock by averaging selected attributes of said at least one defined cluster.

8. The error detection and correction circuit of claim 1, wherein said error concealment circuit reconstructs the lost macroblock by interpolating selected attributes of said at least one defined cluster.

9. The error detection and correction circuit of claim 1, wherein said error concealment circuit estimates at least one motion vector for the lost macroblock based on a plurality of motion vectors of said at least one defined cluster and receives corresponding motion compensation information.

10. A video decoder using region clustering error concealment to reconstruct a lost macroblock of a video frame, comprising:
    a switch having first and second data inputs and an output for providing selected prediction macroblocks;
    an intraframe prediction circuit which provides intraframe prediction information to said first input of said switch;
    a motion compensation circuit which provides motion compensated prediction information to said second input of said switch;
    an adder having a first input coupled to said output of said switch and an output and a second input receiving residual video information, wherein said adder adds selected prediction macroblocks to said residual video information and provides reconstructed frame information at said output of said adder; and
    an error detection and correction circuit, having an input receiving said reconstructed frame information, which detects a lost macroblock of said reconstructed frame information, groups macroblocks neighboring said lost macroblock into at least one cluster, assigns said lost macroblock to at least one of said at least one cluster, and reconstructs said lost macroblock based on selected attributes of said at least one cluster to which said lost macroblock is assigned.

11. The video decoder of claim 10, wherein said error detection and correction circuit comprises:
    a clustering circuit that groups said neighboring macroblocks into said at least one cluster;
    a classification circuit that assigns said lost macroblock to at least one of said at least one cluster; and
    an error concealment circuit that reconstructs said lost macroblock based on selected attributes of said at least one cluster to which said lost macroblock is assigned.

12. The video decoder of claim 11, wherein said clustering circuit subdivides said neighboring macroblocks into a plurality of neighboring sub-blocks and groups said plurality of neighboring sub-blocks into a plurality of clusters, and wherein said classification circuit subdivides said lost macroblock into a plurality of lost sub-blocks and assigns each said lost sub-block to one of said plurality of clusters.

13. The video decoder of claim 10, wherein said error detection and correction circuit performs clustering using any one or any selected combination of attributes comprising coding parameters, texture statistics, color components, frequency analysis, and image processing operators.

14. The video decoder of claim 10, wherein said error detection and correction circuit reconstructs the lost macroblock by averaging each of at least one selected attribute of said at least one cluster.

15. A method of performing error concealment of a lost macroblock of a video frame being decoded by a video decoder, comprising:
    region clustering neighboring macroblocks of the video frame being decoded by the video decoder into one or more clusters based on at least one attribute of each of the neighboring macroblocks;

classifying the lost macroblock of the video frame being decoded by the video decoder to the one or more clusters; and reconstructing the lost macroblock of the video frame being decoded by the video decoder based on selected attributes of the one or more clusters.

16. The method of claim 15, wherein said region clustering comprises subdividing the neighboring macroblocks into neighboring sub-blocks and grouping the neighboring sub-blocks into the one or more clusters.

17. The method of claim 15, further comprising:
if more than one cluster is defined, subdividing the lost macroblock into one or more lost sub-blocks;
said classifying comprising assigning each lost sub-block to a corresponding cluster; and
reconstructing each lost sub-block based on selected attributes of a corresponding cluster to which the lost sub-block is assigned.

18. The method of claim 15, wherein said region clustering comprises clustering based on any one or any selected combination of attributes comprising coding parameters, texture statistics, color components, frequency analysis, and image processing operators.

19. The method of claim 15, wherein said reconstructing comprises averaging or interpolating attributes.

20. The method of claim 15, wherein said reconstructing comprises averaging motion vectors and motion compensating.

* * * * *